(12) United States Patent
Liu et al.

(10) Patent No.: US 10,412,572 B2
(45) Date of Patent: Sep. 10, 2019

(54) DEVICE DISCOVERING METHOD, APPARATUS AND COMPUTER STORAGE MEDIUM THEREOF

(71) Applicant: BAIDU ONLINE NETWORK TECHNOLOGY (BEIJING) CO., LTD., Beijing (CN)

(72) Inventors: Cheng Liu, Beijing (CN); Lei Zhong, Beijing (CN); Jing Zhao, Beijing (CN); Ming Wang, Beijing (CN); Ben Xu, Beijing (CN); Dongmin Ma, Beijing (CN); Yafei Miao, Beijing (CN); Wanjing Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/859,144

(22) Filed: Dec. 29, 2017

(65) Prior Publication Data
US 2019/0149975 A1    May 16, 2019

(30) Foreign Application Priority Data
Nov. 16, 2017    (CN) .......................... 2017 1 1140320

(51) Int. Cl.
*H04W 8/20*    (2009.01)
*H04W 8/00*    (2009.01)
(Continued)

(52) U.S. Cl.
CPC ......... *H04W 8/005* (2013.01); *H04L 41/0809* (2013.01); *H04L 41/22* (2013.01);
(Continued)

(58) Field of Classification Search
CPC ..................................................... H04W 8/005
See application file for complete search history.

(56) References Cited

U.S. PATENT DOCUMENTS

| 7,768,982 B2 * | 8/2010 | Zhang | H04W 48/16 370/252 |
| 2005/0079869 A1 * | 4/2005 | Khalil | H04L 63/08 455/435.1 |

(Continued)

FOREIGN PATENT DOCUMENTS

| CN | 101568189 A | 10/2009 |
| CN | 104780154 A | 7/2015 |

(Continued)

OTHER PUBLICATIONS

First Office Action and search report from CN App. No. 201711140320.7 dated Feb. 14, 2019, with English translation from Global Dossier.

*Primary Examiner* — Gerald A Smarth
(74) *Attorney, Agent, or Firm* — Ladas & Parry, LLP (57) ABSTRACT

The present disclosure provides a device discovering method and apparatus, a device and a computer storage medium, wherein the method comprises: receiving a user instruction instructing to discover devices; if it is found from search that an inter-network connection device exists in a local network and a current device-discovering process has not yet ended, sending first prompt information which includes a manner of guiding the user to trigger the inter-network connection device to be discovered. The manners provided by the present disclosure can guide the manner of triggering the inter-network connection device to be discovered during the device-discovering process, so that the user can conveniently and simply and smoothly trigger the inter-network connection device to be discovered according to the prompt information.

15 Claims, 3 Drawing Sheets

(51) Int. Cl.
*H04L 12/24* (2006.01)
*H04W 48/16* (2009.01)
H04L 12/28 (2006.01)
H04W 12/08 (2009.01)
H04L 29/08 (2006.01)

(52) U.S. Cl.
CPC ........... *H04W 48/16* (2013.01); *H04L 12/282* (2013.01); *H04L 67/12* (2013.01); *H04W 12/08* (2013.01)

(56) References Cited

U.S. PATENT DOCUMENTS

| | | | |
|---|---|---|---|
| 2013/0117836 A1* | 5/2013 | Shieh | H04L 41/12 |
| | | | 726/12 |
| 2014/0134947 A1 | 5/2014 | Stouder-Studenmund | |
| 2014/0351880 A1* | 11/2014 | Low | H04L 63/20 |
| | | | 726/1 |
| 2015/0113099 A1* | 4/2015 | Masera | H04L 67/2861 |
| | | | 709/219 |
| 2016/0337190 A1* | 11/2016 | Wachter | H04W 76/10 |
| 2018/0324040 A1* | 11/2018 | Patterson | H04W 76/10 |
| 2019/0149975 A1* | 5/2019 | Liu | H04W 8/005 |
| | | | 370/254 |

FOREIGN PATENT DOCUMENTS

| | | |
|---|---|---|
| CN | 105629752 A | 6/2016 |
| CN | 105915420 A | 8/2016 |
| CN | 106413132 A | 2/2017 |

* cited by examiner

DEVICE DISCOVERING METHOD, APPARATUS AND COMPUTER STORAGE MEDIUM THEREOF

CROSS REFERENCE TO RELATED APPLICATION

The present application claims priority to Chinese Patent Application No. 201711140320.7, filed on Nov. 16, 2017, with the title of "Device discovering method and apparatus, device, and computer storage medium", the disclosure of which is hereby incorporated herein by reference in its entirety.

FIELD OF THE DISCLOSURE

The present disclosure relates to the technical field of computer application, and particularly to a device discovering method and apparatus, a device and a computer storage medium.

BACKGROUND OF THE DISCLOSURE

As artificial intelligence develops and an era of Internet of things comes, conventional hardware devices transform towards intelligentization. Under a household scenario, an interaction manner between a user and a device also changes revolutionarily from touching a physical button of a device to using geniture operations to expressing demands through a speech instruction nowadays, to implement control of smart household devices.

A typical application scenario is that a procedure of discovering gateway or bridge-type devices in the household network is relatively special, and the user needs to initiatively press physical keys on devices to implement discovery of devices (hereinafter briefly called local devices) in the smart network. However, this point is not known by ordinary users, and the ordinary users usually know this by reading instructions, which is apparently very inconvenient for users. The users usually do not know what to do so that the local devices cannot be smoothly discovered.

SUMMARY OF THE DISCLOSURE

In view of the above, the present disclosure provides a device discovering method and apparatus, a device and a computer storage medium, to facilitate guidance of users and ensure that local devices are discovered smoothly.

Specific technical solutions are as follows:

The present disclosure provides a device discovering method, comprising:

receiving a user instruction instructing to discover devices;

if it is found from search that an inter-network connection device exists in a local network and a current device-discovering process has not yet ended, sending first prompt information which includes a manner of guiding the user to trigger the inter-network connection device to be discovered.

According to a specific implementation mode of the present disclosure, the method further comprises:

searching for the inter-network connection device of the local network through a universal plug and play (UPnP) protocol, and obtaining an address of the inter-network connection device.

According to a specific implementation mode of the present disclosure, the inter-network connection device comprises a gateway or bridge.

According to a specific implementation mode of the present disclosure, a manner in which the inter-network connection device is discovered comprises:

pressing a physical key on the inter-network connection device.

According to a specific implementation mode of the present disclosure, the method further comprises:

if the authorization information of the inter-network connection device has not yet been received when the discovery process ends, sending second prompt information which includes a manner of guiding the user to trigger the inter-network connection device to be discovered when the device is re-discovered.

According to a specific implementation mode of the present disclosure, the method further comprises:

using the authorization information to obtain a local device list if the authorization information of the inter-network connection device is received when the discovery process has not yet ended.

The present invention further provides a device discovering apparatus, the apparatus comprising:

a first receiving unit configured to receive a user instruction instructing to discover devices;

a prompting unit configured to, if it is found from search that an inter-network connection device exists in a local network and a current device-discovering process has not yet ended, send first prompt information which includes a manner of guiding the user to trigger the inter-network connection device to be discovered.

According to a specific implementation mode of the present disclosure, the apparatus further comprises:

a searching unit configured to search for the inter-network connection device of the local network through a universal plug and play (UPnP) protocol, obtain an address of the inter-network connection device, and provide a search result to the prompting unit.

According to a specific implementation mode of the present disclosure, the inter-network connection device comprises a gateway or bridge.

According to a specific implementation mode of the present disclosure, a manner in which the inter-network connection device is discovered comprises:

pressing a physical key on the inter-network connection device.

According to a specific implementation mode of the present disclosure, the apparatus further comprises:

a second receiving unit configured to receive authorization information of the inter-network connection device;

the prompting unit is further configured to, if the second receiving unit has not yet received the authorization information when the discovery process ends, send second prompt information which includes a manner of guiding the user to trigger the inter-network connection device to be discovered when the device is re-discovered.

According to a specific implementation mode of the present disclosure, the apparatus further comprises:

a second receiving unit configured to receive the authorization information of the inter-network connection device;

a local discovery unit configured to use the authorization information to obtain a local device list if the second receiving unit receives the authorization information when the discovery process has not yet ended.

The present disclosure further provides a device, comprising:

one or more processors;

a memory for storing one or more programs;

when said one or more programs are executed by said one or more processors, said one or more processors are enabled to implement the aforesaid method.

The present disclosure further provides a storage medium including a computer-executable instruction, wherein the computer-executable instruction, when executed by a computer processor, is used to implement the aforesaid method.

It is known from the above technical solutions that in the manners provided by the present disclosure, it is possible to guide the manner of triggering the inter-network connection device to be discovered during the device-discovering process, so that the user can conveniently and simply and smoothly trigger the inter-network connection device to be discovered according to the prompt information.

DETAILED DESCRIPTION OF PREFERRED EMBODIMENTS

The present disclosure will be described in detail in conjunction with figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event) is detected" may be construed as "when . . . is determined" or "responsive to determining" or "when . . . (stated condition or event) is detected" or "responsive to detecting (stated condition or event)".

Figure 1:
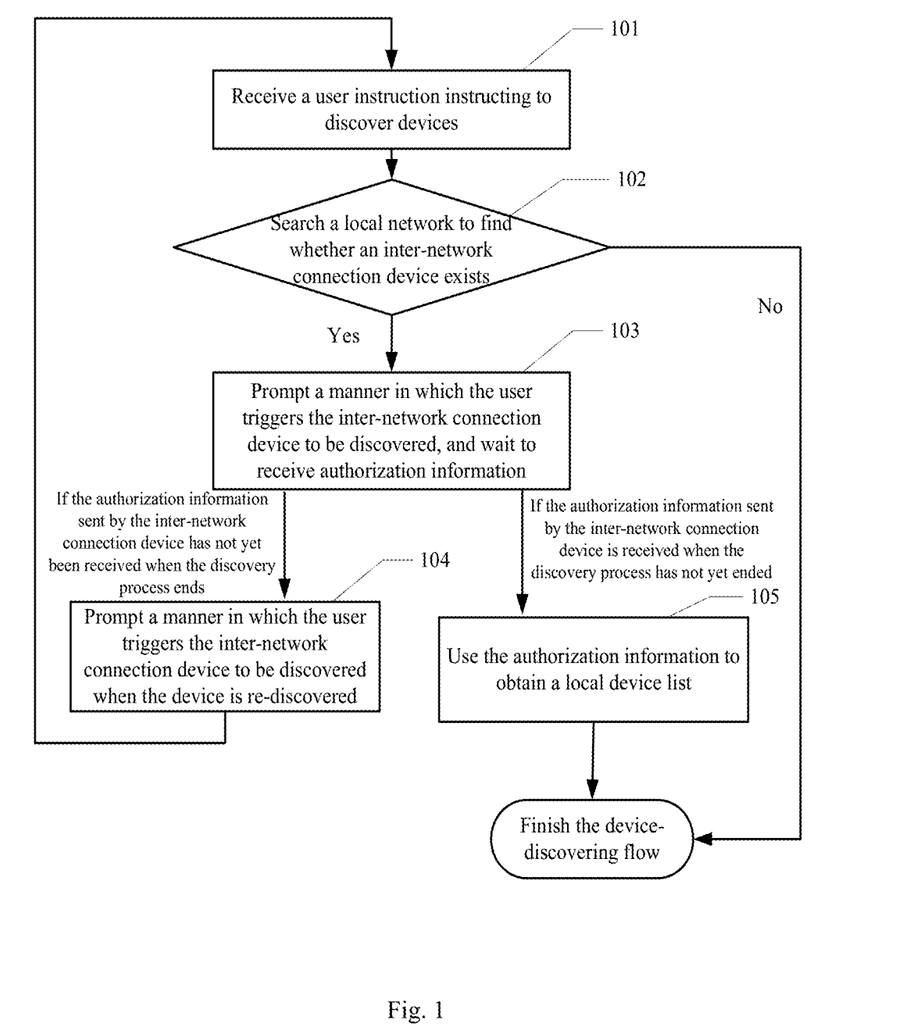
FIG. 1 is a flow chart of a method according to an embodiment of the present disclosure.

FIG. 1 is a flow chart of a method according to an embodiment of the present disclosure. A subject for implementing the method may be an apparatus for discovery recognition, which may be an application in a main control device, a plug-in in the application or a function unit such as a Software Development Kit (SDK). The method may also be executed by a smart network system, or partially executed by the main control device and partially executed by the smart network system. The main control device may be smart user equipment in the local network which can interact with the user and sends a user instruction to the smart network system, for example, a smart acoustic enclosure, a mobile phone, a smart TV set or the like. As shown in FIG. 1, the method may comprise the following steps:

In 101 is received a user instruction instructing to discover devices.

The user may send the user instruction to the main control device. The user instruction may be a speech instruction, for example, the user sends a speech instruction of "discovering devices" to the smart acoustic enclosure. The user instruction may be a gesture operation instruction, for example, the user triggers the instruction of "discovering devices" by inputting a specific gesture on the mobile phone's specific interface. The user instruction may also be an instruction triggered by a physical key, for example, the user triggers an automatic discovery instruction by pressing a physical key on a remote controller of a smart TV set. Certainly, it is further possible to employ other instruction dispatching manners, which will not be exhausted herein.

In 102, search the local network to find whether an inter-network connection device exists, execute 103 if yes and if a current device-discovering process has not yet ended; otherwise, finish the current device-discovering flow.

In the step, the main control device may search for the inter-network connection device of the local network through a universal plug and play (UPnP) protocol, and obtain an address of the inter-network connection device. The inter-network connection device involved in the embodiment of the present disclosure may comprise a gateway or bridge. If the current device-discovering process has not yet ended when the address of the inter-network connection device is obtained, 103 is performed; otherwise, the current device-discovering flow is finished.

In 103, prompt a manner in which the user triggers the inter-network connection device to be discovered, and wait to receive authorization information. If the discovery process ends and the authorization information sent by the inter-network connection device has not yet been received, 104 is performed. If the discovery process has not yet ended, the authorization information sent by the inter-network connection device is received, and 105 is performed.

The manner of triggering the inter-network connection device to be discovered may be pre-configured. Currently, a relatively common manner in which the inter-network connection device is discovered is pressing a physical key on the inter-network connection device. Therefore, it is possible to send prompt information such as "please press a physical key on the bridge", or "if you have XXX, please press its physical key" to the user, wherein XXX may be a name of inter-network connection device. Certainly, inter-network connection devices which are discovered in other manners are also enabled, and the only thing to do is pre-configure information of the manners. Or, different inter-network connection devices may also correspond to different manners of triggering that the inter-network connection device to be discovered, and the main control device may provide corresponding prompts for different inter-network connection devices.

In addition, the above prompt information may also be sent by the smart network system of the cloud to the main control device, and then promoted by the main control device to the user. Specifically, the main control device reports the user instruction to the smart network system of the cloud, performs search and reports a search result to the smart network system of the cloud, and the smart network system sends the prompt information (the prompt information includes a manner of guiding the user to trigger the inter-network connection device to be discovered) to the main control device.

A prompting manner may employ a speech manner, for example, the prompt information is played through a smart acoustic enclosure. It is feasible to employ a manner of displaying the prompt information on the screen, for example, displaying the prompt information on a smart TV set or mobile phone.

After the prompt, the main control device waits the user to press a physical key of the inter-network connection device. If the user presses the physical key of the inter-network connection device, the inter-network connection device is triggered to send the authorization information. The authorization information may be information such as a developer identifier, a token or a specific password. The present disclosure does not limit the form of the authorization information.

In 104, prompt a manner in which the user triggers the inter-network connection device to be discovered when the device is re-discovered, and turn to perform step 101.

If the user still does not press the physical key of the inter-network connection device when the device-discovering process ends, the main control device may send prompt information such as "Please press a physical key of a bridge when the device is re-discovered" or "Discovery is completed. If your XXX device is not discovered, please press a physical key of a bridge when the device is re-discovered" to the user, wherein XXX may be a name of inter-network connection device.

In addition, it is also feasible to execute a device-discovering flow of the cloud (the flow will be introduced subsequently) if a cloud smart network equipment still fails to receive the authorization information of the inter-network connection device sent by the main control device when the discovery process ends. In this case, the prompt information may be sent to the main control device, and the main control device prompts the user. The prompt information may be for example "Discovery is completed. Y devices are found. If your XXX device is not discovered, please press its physical key when the application is re-discovered", wherein Y is the number of devices discovered in the device-discovering flow of the cloud, and XXX is a name of inter-network connection device.

Since the current device-discovering process ends, if the user initiates discovery of device again, turn to perform 101.

In 105, the authorization information is used to obtain a local device list.

If the main control device receives the authorization information sent by the inter-network connection device, it is feasible to continue with the current local device-discovering flow. That is, the authorization information is sent to the cloud smart network system. After receiving the authorization information, the cloud smart network system sends a DeviceDiscoveryRequest to the main control device. The main control device, after receiving the DeviceDiscoveryRequest, uses the authorization information to access an interface for obtaining the device list to obtain the local device list.

In the above flow, if the inter-network connection device is not found from the search in 102, a prompt will not be sent to the user so that the user is puzzled and the device-discovering flow of the cloud is directly completed.

The device-discovering flow of the cloud is mainly that the main control device sends the smart network system a user instruction instructing to discover devices, and the smart network system, after receiving the user instruction, sends the DeviceDiscoveryRequest to a developer BOT. After receiving the DeviceDiscoveryRequest, the developer BOT obtains from a developer side database a device list, namely, a device list on the developer side, corresponding to second authorization information, then returns the device list on the developer side to the smart network system through DeviceDiscoveryResponse, and the smart network system uses the device list on the developer side to update cloud user data in a system side database, thereby achieving the device-discovering flow of the cloud.

The above describes the method according to the present disclosure, and an apparatus according to the present disclosure will be described in detail in conjunction with an embodiment.

Figure 2:
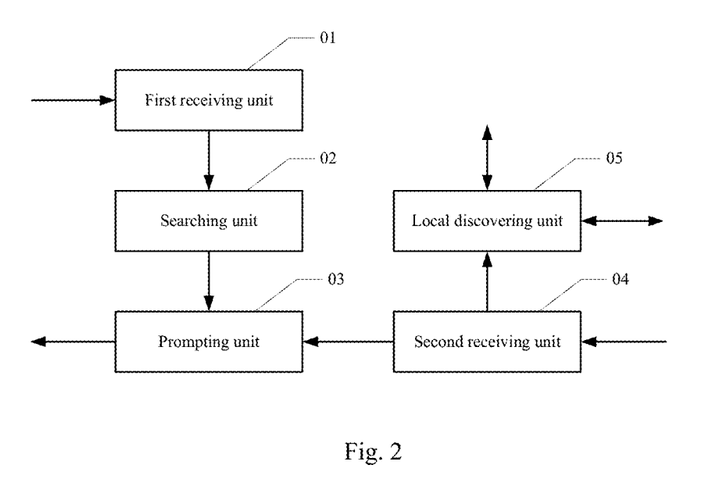
FIG. 2 is a structural schematic diagram of an apparatus according to an embodiment of the present disclosure.

FIG. 2 is a structural schematic diagram of an apparatus according to an embodiment of the present disclosure. The apparatus may be the main control device arranged in the smart network, or the smart network system arranged in the cloud. The apparatus may also be partially arranged in the main control device and partially arranged in the smart network system. The apparatus may be embodied as an application, a plug-in in the application or a function unit such as a Software Development Kit (SDK). As shown in FIG. 2, the apparatus may comprise: a first receiving unit 01 and a prompting unit 03, and may further comprise a searching unit 02, a second receiving unit 04 and a local discovery unit 05. Main functions of the units are as follows:

The first receiving unit 01 is configured to receive a user instruction instructing to discover devices.

The user may send a user instruction to the main control device. The user instruction may be a speech instruction, for example, the user sends a speech instruction of "discovering devices" to the smart acoustic enclosure. The user instruction may be a gesture operation instruction, for example, the user triggers the instruction of "discovering devices" by inputting a specific gesture on the mobile phone's specific interface. The user instruction may also be an instruction triggered by a physical key, for example, the user triggers an automatic discovery instruction by pressing a physical key on a remote controller of a smart TV set. Certainly, it is further possible to employ other instruction dispatching manners, which will not be exhausted herein.

The prompting unit 03 is configured to, when an inter-network connection device is found from search and a current device-discovering process has not yet ended, send first prompt information which includes a manner of guiding the user to trigger the inter-network connection device to be discovered.

The manner of triggering the inter-network connection device to be discovered may be pre-configured. Currently, a relatively common manner in which the inter-network connection device to be discovered is pressing a physical key on the inter-network connection device. Therefore, it is possible to send prompt information such as "please press a physical key on the bridge", or "if you have XXX, please press its physical key" to the user, wherein XXX may be a name of inter-network connection device. Certainly, inter-network connection devices which are discovered in other manners are also enabled, and the only thing to do is pre-configure information of the manners. Or, different inter-network connection devices may also correspond to different manners of triggering that the inter-network connection device to be discovered, and the main control device may provide corresponding prompts for different inter-network connection devices.

A prompting manner may employ a speech manner, for example, the prompt information is played through a smart acoustic enclosure. It is feasible to employ a manner of displaying the prompt information on the screen, for example, displaying the prompt information on a smart TV set or mobile phone.

The searching unit 02 is configured to search the local network to find whether the inter-network connection device exists after the first receiving unit 01 receives the user instruction. The searching unit 02 is disposed on the main control device.

Specifically, the searching unit 02 is configured to search for the inter-network connection device of the local network through a universal plug and play (UPnP) protocol, and obtain an address of the inter-network connection device. The inter-network connection device involved in the embodiment of the present disclosure may comprise a gateway or bridge.

If the user triggers the manner in which the inter-network connection device is discovered according to the prompt, the inter-network connection device sends authorization information to the main control device, whereupon the second receiving unit 04 receives the authorization information of the inter-network connection device. The authorization information may be information such as a developer identifier, a token or a specific password. The present disclosure does not limit the form of the authorization information.

If the second receiving unit 04 has not yet received the authorization information when the discovery process ends, the promoting unit 03 sends second prompt information which includes a manner of guiding the user to trigger the inter-network connection device to be discovered when the device is re-discovered.

If the user still does not press the physical key of the inter-network connection device when the device-discovering process ends, it is feasible to send prompt information such as "Please press a physical key of a bridge when the device is re-discovered" or "Discovery is completed. If your XXX device is not discovered, please press a physical key of a bridge when the device is re-discovered" to the user, wherein XXX may be a name of inter-network connection device.

If the device-discovering process has not yet ended, the second receiving unit 04 receives the authorization information, and continues with the current local device-discovering flow, and the local discovery unit 05 uses the authorization information to obtain a local device list.

If the local discovery unit 05 is arranged at the main control device, it sends the authorization information to the smart network system, and after receiving the DeviceDiscoveryRequest sent by the smart network device, uses the authorization information to access an interface for obtaining the device list, thereby obtaining the local device list.

If the local discovery unit 05 is arranged at the smart network system of the cloud, it sends the DeviceDiscoveryRequest to the main control device after receiving the authorization information sent by the main control device.

Figure 3:
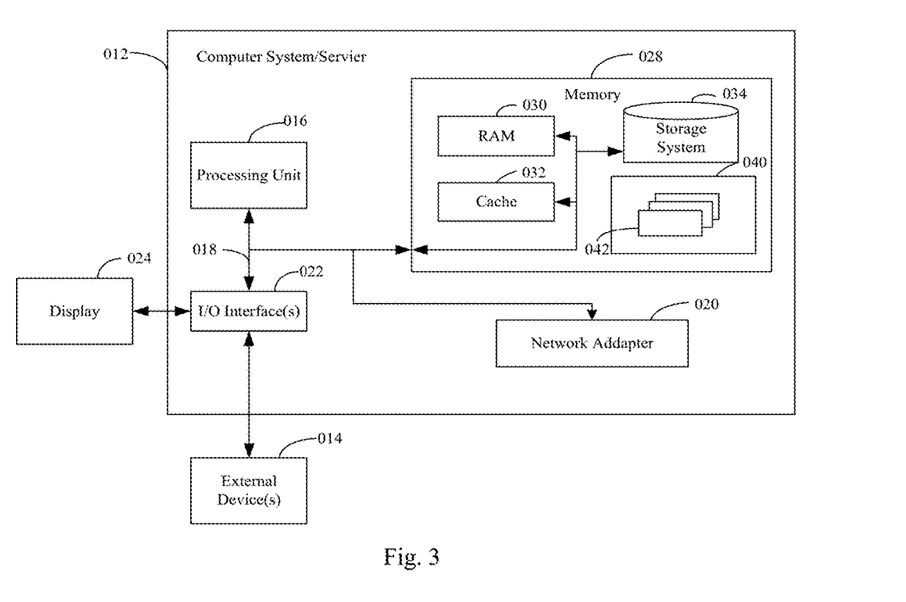
FIG. 3 illustrates a block diagram of an example computer system/server adapted to implement an implementation mode of the present disclosure.

FIG. 3 is a block diagram of an example computer system/server 012 adapted to implement an implementation mode of the present disclosure. The computer system/server 012 shown in FIG. 3 is only an example and should not bring about any limitation to the function and scope of use of the embodiments of the present disclosure.

As shown in FIG. 3, the computer system/server 012 is shown in the form of a general-purpose computing device. The components of computer system/server 012 may include, but are not limited to, one or more processors or processing units 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 3 and typically called a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via network adapter 020. As depicted in FIG. 3, network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement the flow of the method according to an embodiment of the present disclosure.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure. For example, said one or more processors execute the flow of the method according to the embodiment of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for discovering at least one inter-network connection device in a local network, wherein the method is implemented by a main control device and comprises:
   Receiving a user instruction instructing to discover the at least one inter-network connection device;
   when it is found from search that the at least one inter-network connection device exists in the local network and a current device-discovering process has not yet ended, sending first prompt information which includes a manner of guiding the user to trigger the at least one inter-network connection device to be discovered,
   wherein the method further comprises:
   searching for the at least one inter-network connection device of the local network through a universal plug and play (UPnP) protocol, and obtaining an address of the at least one inter-network connection device.

2. The method according to claim 1, wherein the at least one inter-network connection device comprises a gateway or bridge.

3. The method according to claim 1, wherein the manner in which the at least one inter-network connection device is discovered comprises:
   pressing a physical key on the at least one inter-network connection device.

4. The method according to claim 1, wherein the method further comprises:
   when authorization information of the at least one inter-network connection device has not yet been received when the discovery process ends, sending second prompt information which includes a manner of guiding the user to trigger the at least one inter-network connection device to be discovered when the device is re-discovered.

5. The method according to claim 1, wherein the method further comprises:
   using the authorization information to obtain a local device list when the authorization information of the at least one inter-network connection device is received when the discovery process has not yet ended.

6. An apparatus, wherein the apparatus comprises:
one or more processors;
a memory;
one or more programs stored in the memory and configured to execute the following operation when executed by the one or more processors:
receiving a user instruction instructing to discover at least one inter-network connection device in a local network;
when it is found from search that the at least one inter-network connection device exists in the local network and a current device-discovering process has not yet ended, sending first prompt information which includes a manner of guiding the user to trigger the at least one inter-network connection device to be discovered,
wherein the operation further comprises searching for the at least one inter-network connection device of the local network through a universal plug and play (UPnP) protocol, and obtaining an address of the at least one inter-network connection device.

7. The device according to claim 6, wherein the at least one inter-network connection device comprises a gateway or bridge.

8. The device according to claim 6, wherein the manner in which the at least one inter-network connection device is discovered comprises:
pressing a physical key on the at least one inter-network connection device.

9. The device according to claim 6, wherein the operation further comprises:
when authorization information of the at least one inter-network connection device has not yet been received when the discovery process ends, sending second prompt information which includes a manner of guiding the user to trigger the at least one inter-network connection device to be discovered when the device is re-discovered.

10. The device according to claim 6, wherein the operation further comprises:
using the authorization information to obtain a local device list when the authorization information of the at least one inter-network connection device is received when the discovery process has not yet ended.

11. A non-transitory computer storage medium in which one or more programs are stored, an apparatus being enabled to execute the following operation when said one or more programs are executed by the apparatus:
receiving a user instruction instructing to discover at least one inter-network connection device in a local network;
when it is found from search that the at least one inter-network connection device exists in the local network and a current device-discovering process has not yet ended, sending first prompt information which includes a manner of guiding the user to trigger the at least one inter-network connection device to be discovered,
wherein the operation further comprises searching for the at least one inter-network connection device of the local network through a universal plug and play (UPnP) protocol, and obtaining an address of the at least one inter-network connection device.

12. The non-transitory computer storage medium according to claim 11, wherein the at least one inter-network connection device comprises a gateway or bridge.

13. The non-transitory computer storage medium according to claim 11, wherein the manner in which the at least one inter-network connection device is discovered comprises:
pressing a physical key on the at least one inter-network connection device.

14. The non-transitory computer storage medium according to claim 11, wherein the operation further comprises:
when authorization information of the at least one inter-network connection device has not yet been received when the discovery process ends, sending second prompt information which includes a manner of guiding the user to trigger the at least one inter-network connection device to be discovered when the device is re-discovered.

15. The non-transitory computer storage medium according to claim 11, wherein the operation further comprises:
using the authorization information to obtain a local device list when the authorization information of the at least one inter-network connection device is received when the discovery process has not yet ended.

* * * * *